(12) United States Patent
Tang et al.

(10) Patent No.: US 10,306,589 B2
(45) Date of Patent: May 28, 2019

(54) HYBRID REFERENCE SIGNALS FOR WIRELESS COMMUNICATION

(71) Applicant: Intel IP Corporation, Santa Clara, CA (US)

(72) Inventors: Yang Tang, Pleasanton, CA (US); Jong-Kae Fwu, Sunnyvale, CA (US); Yi Hsuan, Sunnyvale, CA (US); Seunghee Han, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 3 days.

(21) Appl. No.: 14/778,037

(22) PCT Filed: Dec. 12, 2013

(86) PCT No.: PCT/US2013/074692
§ 371 (c)(1),
(2) Date: Sep. 17, 2015

(87) PCT Pub. No.: WO2014/175923
PCT Pub. Date: Oct. 30, 2014

(65) Prior Publication Data
US 2016/0294514 A1    Oct. 6, 2016

Related U.S. Application Data

(60) Provisional application No. 61/816,662, filed on Apr. 26, 2013.

(51) Int. Cl.
*H04W 68/02* (2009.01)
*H04N 7/14* (2006.01)
(Continued)

(52) U.S. Cl.
CPC ............. *H04W 68/02* (2013.01); *H04J 11/00* (2013.01); *H04J 11/005* (2013.01);
(Continued)

(58) Field of Classification Search
CPC .......... H04W 72/042; H04W 72/0413; H04W 72/0453; H04W 72/04; H04W 72/1289;
(Continued)

(56) References Cited

U.S. PATENT DOCUMENTS

2010/0260059 A1    10/2010   Zhang et al.
2010/0322179 A1*   12/2010   Yu ........................ H04L 5/0048
                                                              370/329
(Continued)

FOREIGN PATENT DOCUMENTS

CN           102265537 A    11/2011

OTHER PUBLICATIONS

International Search Report and Written Opinion dated Mar. 25, 2014 from International Application No. PCT/US2013/074692.
(Continued)

*Primary Examiner* — Jaime M Holliday
(74) *Attorney, Agent, or Firm* — Schwabe, Williamson & Wyatt, P.C.

(57) ABSTRACT

Embodiments of the present disclosure describe systems and methods for hybrid reference signal transmission in wireless communication. In some embodiments, an apparatus may include assignment logic to assign indices to a first set and a second set; identification logic to identify resource elements for a hybrid reference signal in accordance with a first rule for each index in the first set and in accordance with a second rule for each index in the second set, the second rule different from the first rule; and transmission logic to provide the hybrid reference signal for wireless transmission using a common transmission mode in the identified resource elements. Other embodiments may be described and/or claimed.

20 Claims, 4 Drawing Sheets

(51) Int. Cl.
| | |
|---|---|
| H04W 76/14 | (2018.01) |
| H04W 4/70 | (2018.01) |
| H04W 76/27 | (2018.01) |
| H04W 76/28 | (2018.01) |
| H04W 28/02 | (2009.01) |
| H04W 72/04 | (2009.01) |
| H04W 52/02 | (2009.01) |
| H04W 8/00 | (2009.01) |
| H04L 5/00 | (2006.01) |
| H04W 88/02 | (2009.01) |
| H04W 36/00 | (2009.01) |
| H04W 60/00 | (2009.01) |
| H04L 29/06 | (2006.01) |
| H04W 8/22 | (2009.01) |
| H04J 11/00 | (2006.01) |
| H04W 24/06 | (2009.01) |
| H04W 72/12 | (2009.01) |
| H04W 48/18 | (2009.01) |
| H04L 12/14 | (2006.01) |
| H04L 29/08 | (2006.01) |
| H04L 1/18 | (2006.01) |
| H04W 52/32 | (2009.01) |
| H04N 7/15 | (2006.01) |
| H04W 68/00 | (2009.01) |
| H04L 12/26 | (2006.01) |
| H04L 1/16 | (2006.01) |
| H04W 52/08 | (2009.01) |
| H04L 12/801 | (2013.01) |
| H04W 48/06 | (2009.01) |
| H04W 76/18 | (2018.01) |
| H04W 76/38 | (2018.01) |
| H04W 72/14 | (2009.01) |
| H04W 88/06 | (2009.01) |
| H04N 21/4728 | (2011.01) |
| H04N 21/4788 | (2011.01) |
| H04N 21/6437 | (2011.01) |
| H04W 52/14 | (2009.01) |
| H04W 52/24 | (2009.01) |

(52) U.S. Cl.
CPC ........ *H04J 11/0023* (2013.01); *H04L 1/1671* (2013.01); *H04L 1/1812* (2013.01); *H04L 5/005* (2013.01); *H04L 5/0007* (2013.01); *H04L 5/0032* (2013.01); *H04L 5/0033* (2013.01); *H04L 5/0073* (2013.01); *H04L 12/1407* (2013.01); *H04L 29/06068* (2013.01); *H04L 43/16* (2013.01); *H04L 47/12* (2013.01); *H04L 65/105* (2013.01); *H04L 65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04L 67/02* (2013.01); *H04L 67/10* (2013.01); *H04N 7/141* (2013.01); *H04N 7/147* (2013.01); *H04N 7/15* (2013.01); *H04W 4/70* (2018.02); *H04W 8/005* (2013.01); *H04W 8/22* (2013.01); *H04W 24/06* (2013.01); *H04W 28/0236* (2013.01); *H04W 28/0289* (2013.01); *H04W 36/0066* (2013.01); *H04W 48/18* (2013.01); *H04W 52/0212* (2013.01); *H04W 52/0216* (2013.01); *H04W 52/08* (2013.01); *H04W 52/32* (2013.01); *H04W 60/00* (2013.01); *H04W 68/00* (2013.01); *H04W 72/0446* (2013.01); *H04W 72/0486* (2013.01); *H04W 72/1231* (2013.01); *H04W 72/1278* (2013.01); *H04W 76/14* (2018.02); *H04W 76/27* (2018.02); *H04W 76/28* (2018.02); *H04W 88/02* (2013.01); *H04L 1/1861* (2013.01); *H04L 5/0044* (2013.01); *H04L 5/0055* (2013.01); *H04L 47/10* (2013.01); *H04N 21/4728* (2013.01); *H04N 21/4788* (2013.01); *H04N 21/6437* (2013.01); *H04W 48/06* (2013.01); *H04W 52/146* (2013.01); *H04W 52/242* (2013.01); *H04W 52/325* (2013.01); *H04W 72/04* (2013.01); *H04W 72/042* (2013.01); *H04W 72/044* (2013.01); *H04W 72/0413* (2013.01); *H04W 72/0453* (2013.01); *H04W 72/1284* (2013.01); *H04W 72/1289* (2013.01); *H04W 72/14* (2013.01); *H04W 76/18* (2018.02); *H04W 76/38* (2018.02); *H04W 88/06* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/23* (2018.01); *Y02D 70/24* (2018.01); *Y02D 70/26* (2018.01)

(58) Field of Classification Search
CPC ............. H04W 72/1284; H04W 72/14; H04W 72/044

See application file for complete search history.

(56) References Cited

U.S. PATENT DOCUMENTS

| | | | |
|---|---|---|---|
| 2011/0038310 A1 | 2/2011 | Chmiel et al. | |
| 2011/0038344 A1* | 2/2011 | Chmiel | H04W 48/08 370/330 |
| 2011/0237267 A1 | 9/2011 | Chen et al. | |
| 2011/0243023 A1* | 10/2011 | Taoka | H04L 5/0023 370/252 |
| 2012/0033643 A1* | 2/2012 | Noh | H04L 5/0048 370/335 |
| 2012/0201187 A1 | 8/2012 | Koo et al. | |
| 2013/0176964 A1* | 7/2013 | Pan | H04B 7/0426 370/329 |
| 2013/0301542 A1* | 11/2013 | Krishnamurthy | H04W 52/50 370/329 |
| 2014/0198763 A1* | 7/2014 | Sorrentino | H04B 7/024 370/330 |

OTHER PUBLICATIONS

3GPP, "Technical Specification Group Radio Access Network; Evolved Universal Terrestrial Radio Access (E-UTRA); Physical Channels and Modulation (Release 11)," 3GPP TS 36.211 V11.2.0 (Feb. 2013), Mar. 15, 2013, Lte Advanced, 109 pages.

Intel Corporation, "Discussion on frequency offset tracking for DL CoMP," 3GPP TSG-RAN WG1 #71, R1-124720, Agenda item: 6.2.2.1.2, Nov. 12-16, 2012, New Orleans, USA, 6 pages.

* cited by examiner

HYBRID REFERENCE SIGNALS FOR WIRELESS COMMUNICATION

CROSS REFERENCE TO RELATED APPLICATIONS

This application is a national phase entry under 35 U.S.C. § 371 of International Application No. PCT/US2013/074692, filed Dec. 12, 2013, entitled "HYBRID REFERENCE SIGNALS FOR WIRELESS COMMUNICATION", which claims priority to U.S. Provisional Patent Application No. 61/816,662, filed Apr. 26, 2013, entitled "Advanced Wireless Communication Systems and Techniques," which are hereby incorporated by reference herein in their entireties.

FIELD

Embodiments of the present disclosure generally relate to the field of wireless communication, and more particularly, to reference signals for wireless communication.

BACKGROUND

Reference signals may be used in conventional wireless communication systems for a number of purposes, such as channel measurement and data demodulation. Some conventional wireless communication systems include multiple types of reference signals, and use each for overlapping and occasionally redundant purposes. These multiple kinds of reference signals may incur excessive overhead, and may not be suitable for noisy or changing environments.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
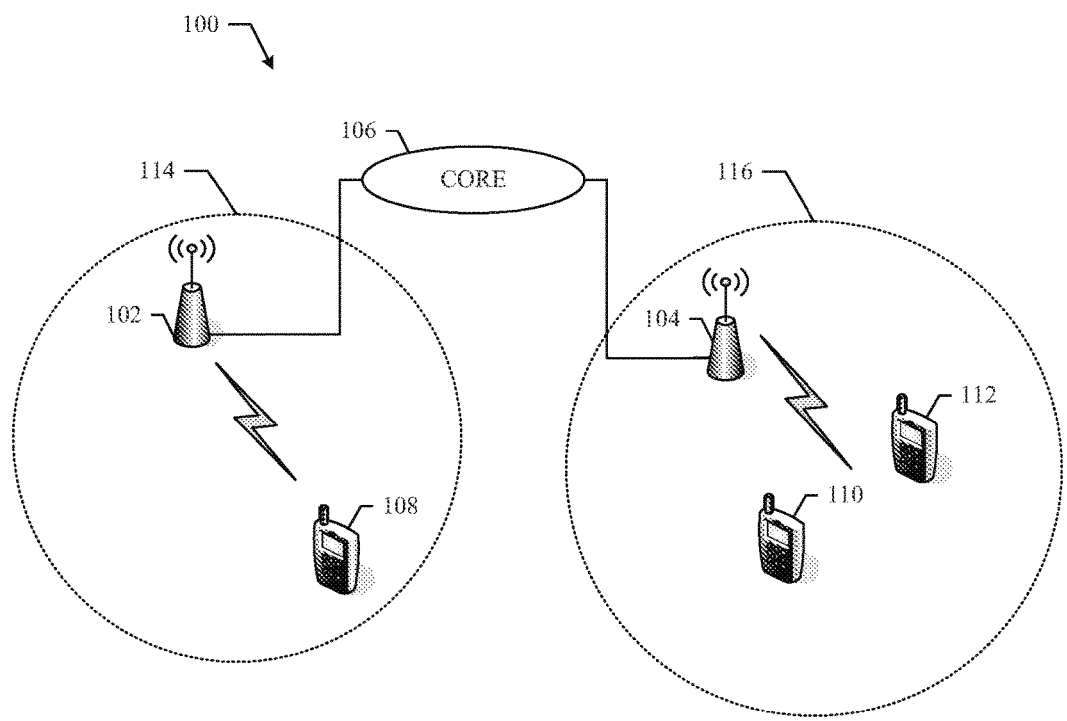
FIG. 1 illustrates an example wireless communication network, in accordance with various embodiments.

Embodiments of the present disclosure describe systems and methods for hybrid reference signal transmission in wireless communication. In some embodiments, an apparatus may include assignment logic to assign indices to a first set and a second set; identification logic to select resource elements for a hybrid reference signal in accordance with a first rule for each index in the first set and in accordance with a second rule for each index in the second set, the second rule different from the first rule; and transmission logic to provide the hybrid reference signal for wireless transmission using a common transmission mode in the identified resource elements.

The hybrid reference signal techniques disclosed herein may provide improvements over conventional reference signals in wireless communication. As noted above, some conventional systems provide multiple types of reference signals that overlap in purpose. For example, the Third Generation Partnership Project Long Term Evolution ("3GPP LTE") standard includes cell-specific reference signals ("CRS"), channel state information reference signals ("CSIRS"), and demodulation reference signals ("DMRS"). CRS is intended for use in both channel measurement and data demodulation, CSIRS is intended for use in channel measurement, and DMRS is intended for use in data demodulation. CSIRS symbols may be transmitted less often (in both time and frequency dimensions, referred to as having a "lower density") than CRS symbols, and the number of CSIRS symbols transmitted may depend on the number of antenna ports used for providing reference signals. DMRS symbols may have a higher density than CSIRS symbols, and the number of DMRS symbols transmitted may depend on the number of transmission layers (typically less than the number of antenna ports).

The various types of reference signals may have different strengths and weaknesses. For example, the use of CRS may be advantageous over the use of CSIRS for synchronization and time/frequency tracking purposes, while the use of CSIRS may be advantageous over the use of CRS because of its lower density and thus higher efficiency. However, although the 3GPP LTE standard includes both CRS and CSIRS, the standard segregates the two types of reference signals, using each to serve a different transmission mode. Maintaining both types of reference signals for channel measurement purposes may incur unnecessary redundancy and undesirable overhead while failing to take advantage of the potential complementarity between the reference signal types.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable hardware components that provide the described functionality.

The embodiments described herein may be used in a variety of applications including transmitters and receivers of a mobile wireless radio system. Radio systems specifically included within the scope of the embodiments include, but are not limited to, network interface cards ("NICs"), network adaptors, base stations, access points ("APs"), relay nodes, Node Bs, gateways, bridges, hubs and satellite radiotelephones. Further, the radio systems within the scope of embodiments may include satellite systems, personal communication systems ("PCS"), two-way radio systems, global positioning systems ("GPS"), two-way pagers, personal computers ("PCs") and related peripherals, personal digital assistants ("PDAs"), and personal computing, among others.

Referring now to FIG. 1, an example wireless communication environment 100, in accordance with various embodiments, is illustrated. The wireless communication environment 100 may be configured as one or more wireless communication networks, such as a wireless personal area network ("WPAN"), a wireless local area network ("WLAN"), and a wireless metropolitan area network ("WMAN").

The wireless communication environment 100 may include one or more user equipments ("UEs"), generally shown as 108, 110 and 112. As described below, one or more of the UEs 108, 110 and 112 may be configured to support hybrid reference signals. The UEs 108, 110 and 112 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts three UEs, wireless communication environment 100 may include more or fewer UEs.

The UEs 108, 110 and 112 may be configured to communicate via radio links with one or more access nodes (ANs), generally shown as 102 and 104. As illustrated in FIG. 1, the AN 102 may serve the UE 108 in a cell 114, and the AN 104 may serve the UEs 110 and 112 in a cell 116. In some embodiments, the ANs 102 and 104 may include or be included in evolved node Bs (eNBs), remote radio heads (RRHs), etc. In some embodiments, the ANs 102 and 104 may be eNBs deployed in a heterogeneous network. In such embodiments, the ANs 102 and 104 may be referred to as, for example, femto-, pico-, or macro-eNBs and may be respectively associated with femtocells, picocells, or macrocells.

Wireless communication may include a variety of modulation techniques such as spread spectrum modulation (e.g., direct sequence code division multiple access ("DS-CDMA") and/or frequency hopping code division multiple access ("FH-CDMA")), time-division multiplexing ("TDM") modulation, frequency-division multiplexing ("FDM") modulation, orthogonal frequency-division multiplexing ("OFDM") modulation, multi-carrier modulation ("MDM"), and/or other suitable modulation techniques to communicate via wireless links. The ANs 102 and 104 may be connected to a core network 106, through which authentication and inter-AN communication may occur.

The UEs 108, 110 and 112 may be configured to communicate using a multiple-input and multiple-output ("MIMO") communication scheme. The ANs 102 and 104 may include one or more antennas, one or more radio modules to modulate and/or demodulate signals transmitted or received on an air interface, and one or more digital modules to process signals transmitted and received on the air interface. One or more antennas of the UEs 108, 110 and 112 may be used to concurrently utilize radio resources of multiple respective component carriers (e.g., which may correspond with antennas of ANs 102 and 104) of the wireless communication environment 100.

Embodiments of the systems and methods described herein may be implemented in broadband wireless access networks including networks operating in conformance with one or more protocols specified by 3GPP and its derivatives, the Worldwide Interoperability for Microwave Access ("WiMAX") Forum, the IEEE 802.16 standards (e.g., IEEE 802.16-2005 Amendment), the LTE project along with any amendments, updates, and/or revisions (e.g., advanced LTE project, ultra mobile broadband ("UMB") project (also referred to as "3GPP2"), etc.). Many of the examples described herein may refer to wireless communication networks that conform with 3GPP for ease of discussion; however, the subject matter of the present disclosure is not limited in this regard and the described embodiments may apply to other wireless communication networks that may benefit from the systems and techniques described herein, such as specifications and/or standards developed by other special interest groups and/or standard development organizations (e.g., Wireless Fidelity ("Wi-Fi") Alliance, WiMAX Forum, Infrared Data Association ("IrDA"), etc.).

In some embodiments, the AN 102 may be configured to provide a hybrid reference signal in accordance with various embodiments. As used herein, a "reference signal" may refer to a signal transmitted between two wireless devices that is accessed by the physical layers of the devices but does not carry information originating from higher layers in the protocol stack. In some embodiments, a reference signal may be used for channel estimation for demodulation, for the transmission of channel state information, for cell selection decisions, and/or for handover decisions, for example. A reference signal may consist of various symbols transmitted in various resource elements, as discussed below. In some embodiments, the hybrid reference signals disclosed herein may provide improved time and frequency resource efficiency while maintaining or improving on conventional reference signals in channel measurement, time/frequency tracking, and synchronization, for example. Embodiments of the hybrid reference signals disclosed herein may also be dynamically adjustable (e.g., by changing the density of the hybrid reference signal) in response to different wireless communication condition events (e.g., when a signal-to-noise ratio ("SNR") drops below a threshold).

Figure 2:
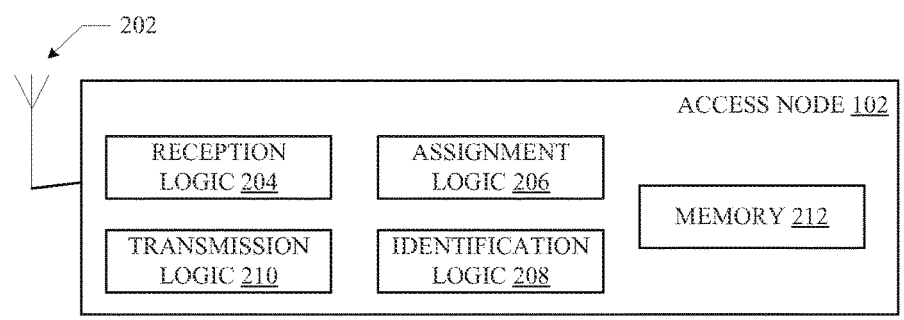
FIG. 2 is a block diagram of an illustrative access node ("AN") configured to provide a hybrid reference signal, in accordance with various embodiments.

Referring now to FIG. 2, example components of the AN 102 are illustrated. The components of the AN 102, discussed in detail below, may be included in any one or more ANs included in a wireless communication network (e.g., the AN 104 of the wireless communication network 100). In some embodiments, the AN 102 may be an eNB, or included in an eNB.

The AN 102 may include assignment logic 206, which may be configured to assign indices to a first set ("S1") and a second set ("S2"). In some embodiments, each index may correspond to a resource block, and thus S1 and S2 may each correspond to sets of resource blocks. As used herein, a "resource block" may refer to a collection of time and frequency resources. In particular, a resource block may refer to a collection of a number of consecutive subcarriers in the frequency domain and an interval of time in the time domain. The resource block size in the frequency domain, $N_{sc}^{RB}$, may be expressed as the number of subcarriers in the resource block. The time dimension of one resource block may be referred to as a "slot" and may have a fixed duration (e.g., 0.5 milliseconds). The size of the time dimension may alternatively be expressed as the number of symbols (e.g., OFDM symbols), $N_{symb}^{DL}$, in the resource block. For example, a resource block may consist of 12 consecutive subcarriers in the frequency domain ($N_{sc}^{RB}$=12), and 6 or 7 symbols in the time domain ($N_{symb}^{DL}$=6 or 7, depending on whether an extended or normal cyclic prefix ("CP") is used, respectively). In some embodiments, subcarriers in the frequency domain may be separated by a fixed amount (e.g., 15 kilohertz).

In some embodiments, the total number of indices may be equal to a multiple of the downlink bandwidth $N_{DL}^{RB}$, which may be expressed as a multiple of the resource block size $N_{sc}^{RB}$ in the frequency domain. This multiple may be less than, greater than, or equal to one; thus, in various embodiments, each index may correspond with more than one resource block, a portion of a resource block, or a single resource block, respectively. In some embodiments, each resource block in the downlink bandwidth may correspond to a unique index (e.g., when the multiple is 1) or to more than one index (e.g., when the multiple is greater than one). In some embodiments, some resource blocks may not correspond to any indices (e.g., when the multiple is less than one, and only alternating resource blocks or some other subset of resource blocks are associated with indices).

A "radio frame," "half-frame" and "subframe" may refer to fixed numbers of resource blocks contiguous in the time domain, and the definitions of these frame structures may vary depending upon the communication mode. For example, a type 1 subframe may refer to 2 slots of contiguous resource blocks, and a type 1 radio frame may refer to 10 contiguous subframes (e.g., 20 slots of contiguous resource blocks). A type 1 frame structure may be used in FDD communications, for example. A type 2 subframe may refer to 2 slots of contiguous resource blocks, a type 2 half-frame may refer to five contiguous subframes, and a type 2 radio frame may refer to 2 half-frames (i.e., 20 slots of contiguous resource blocks). A type 2 frame structure may be used in TDD communications, for example.

The set S1 and/or the set S2 may be a contiguous set of integer-valued indices (e.g., a plurality of contiguous indices between a minimum value M1 and a maximum value M2) or may not be a contiguous set of integer-valued indices. In some embodiments, the assignment logic 206 may assign indices to S1 and S2 by storing data representative of the indices included in S1 and S2 in the memory 212, which may include any suitable memory device(s) and supporting circuitry, such as the memory devices discussed below with reference to FIG. 6. For example, in embodiments in which S1 (and/or S2) is a plurality of contiguous indices between a minimum value M1 and a maximum value M2 (e.g., M1, M1+1, ..., M2−1, M2), the assignment logic 206 may store data representative of the first and last indices in the contiguous set in the memory 212 (e.g., M1 and M2). In some embodiments, S1 may be a contiguous set of indices {M1, M1+1, ..., M2−1, M2} in the middle of the set of available indices {0, 1, ..., $N_{DL}^{RB}$−1}) and S2 may be the set of indices {0, 1, ..., M1, M2+1, ..., $N_{DL}^{RB}$−1}. In some such embodiments, the assignment logic 206 may store data representative of the values M1 and M2.

In some embodiments, the assignment logic 206 may be configured to assign indices to more than two sets (e.g., three, four or more sets of indices). Each of these sets of indices may be associated with a different rule, as discussed below with reference to the identification logic 208. Although embodiments using two sets of indices and associated rules are principally discussed herein for ease of illustration, embodiments including three or more sets of indices and associated rules may be readily implemented using the techniques discussed herein. The assignment of indices to sets need not be exclusive; for example, an index may be assigned to both S1 and S2. The assignment of indices to sets need not be comprehensive; for example, a particular index may not be assigned to either S1 or S2.

In some embodiments, the assignment logic 206 may assign indices to two or more sets for a single antenna port that will be used to transmit the hybrid reference signal. In some embodiments, the assignment logic 206 may assign indices to two or more sets for each of a plurality of antenna ports over which a hybrid reference signal may be transmitted. For example, the assignment logic 206 may assign indices such that S1={0,1} and S2={2,3} for a first antenna port, and may assign indices such that S1={0, 1, 2} and S2={3} for a second, different antenna port. Although a single S1 and a single S2 are often referred to herein for ease of illustration, the hybrid reference signal embodiments disclosed herein may include different sets of indices for different antenna ports. Moreover, the sets of indices for different antenna ports may be independently adjusted, as discussed in detail below. In some embodiments, the AN 102 may be configured to determine how many antenna ports to use in the transmission of a hybrid reference signal based on, for example, one or more SNR measurements made or received by the reception logic 204, discussed below. In some embodiments, the AN 102 may be configured to increase the number of antenna ports used for transmission of a hybrid reference signal in low SNR environments.

The AN 102 may include identification logic 208. The identification logic 208 may be coupled with the assignment logic 206, and may be configured to identify resource elements for a hybrid reference signal in accordance with a first rule ("R1") for each index in the first set, and to identify resource elements for the hybrid reference signal in accordance with a different, second rule ("R2") for each index in the second set. As used herein, a "resource element" may refer to a collection of time and frequency resources consisting of one subcarrier in the frequency domain and one symbol (e.g., one OFDM symbol) in the time domain. Thus, in some embodiments as discussed above, a resource block may include 6*12=72 (extended CP) or 7*12=84 (normal CP) resource elements. Resource elements may be referred to herein by a coordinate pair (k,l), where k represents the subcarrier number of the resource element (e.g., having a value between 0 and $N_{DL}^{RB}$−1) and l represents the symbol number of the resource element (e.g., having a value between 0 and $N_{symb}^{DL}$−1). For ease of illustration, embodiments in which the size of the resource block is 15 subcarriers in the frequency domain ($N_{sc}^{RB}$) and 7 symbols in the time domain ($N_{symb}^{DL}$) will be frequently discussed herein, but resource blocks having any other size in the time and frequency domains may be used.

The identification logic 208 may perform a resource element identification process using R1 and R2. In particular, the identification logic 208 may provide an index as an input to R1 or R2 (depending on whether the index is included in S1 or S2, respectively), and may receive an indicator of one or more resource elements as an output.

In some embodiments, R1 and R2 may output different numbers of resource elements for a single index. For example, in some embodiments in which each index corresponds to a resource block, R1 may identify one resource element per slot of a radio frame, and R2 may identify one resource element per subframe of a radio frame.

In the hybrid reference signal whose resource elements are identified by the identification logic 208 via R1 and R2, various symbols may be transmitted in the identified resource elements. In some embodiments, the identification logic 208 may be configured to identify symbols for the hybrid reference signal in accordance with R1 for each index in S1, and to identify symbols for the hybrid reference signal in accordance with R2 for each index in S2. In particular, the identification logic 208 may provide an index as an input to R1 or R2 (depending on whether the index is included in S1 or S2, respectively), and may receive, as an output, an indicator of one or more identified symbols for transmission in the corresponding one or more identified resource elements. The hybrid reference signal may thus consist of the identified symbols to be transmitted in the identified resource elements.

Because different rules may provide reference signal portions having different densities (e.g., identifying more or fewer resource elements per index), a hybrid reference signal generated using the resource elements identified by the identification logic 208 may have a time-varying density. Moreover, the density of the hybrid reference signal may be adjusted by adjusting the distribution of indices between S1 and S2. Adjusting the density of the hybrid reference signal may be useful in any of a number of applications. For example, when a UE (such as the UE 108) is performing time/frequency tracking or synchronization, the accuracy of these procedures may be a function of the density of the reference signal used to perform the procedure, with higher density reference signals resulting in higher accuracy. Under conditions in which accuracy may be compromised (e.g., low SNR conditions), the density of the hybrid reference signal may be increased to compensate.

Additionally, as noted above, the sets S1 and S2 may be assigned and adjusted differently for different antenna ports. This may allow a hybrid reference signal to be generated that includes higher density portions that do not interfere between multiple antennas. Conventional reference signals, such as CRS, may not be simply replicated on multiple antenna ports because the high density of each CRS makes interference between multiple antenna ports likely. However, by adjusting the density of the hybrid reference signal within and across antenna ports, desired densities may be achieved without interference.

The AN 102 may include transmission logic 210. The transmission logic 210 may be coupled with the identification logic 208 and may be configured to provide wired and/or wireless signals to other devices, such as any of the devices discussed above with reference to FIG. 1. In particular, the transmission logic 210 may be configured to provide the hybrid reference signal for wireless transmission in the resource elements identified by the identification logic 208. The hybrid reference signal, including symbols transmitted in resource elements identified via R1 and symbols transmitted in resource elements identified via R2, may be transmitted using a common transmission mode. As used herein, a "transmission mode" may refer to a particular wireless transmission configuration, such a single antenna, transmit diversity, closed-loop spatial multiplexing, and multi-user MIMO, for example.

In some embodiments, the transmission logic 210 may provide a hybrid reference signal for wireless transmission by storing data representative of the one or more identified resource elements in a queue for later transmission. This queue may reside in the memory 212. In some embodiments, the transmission logic 210 may provide a hybrid reference signal for wireless transmission by sending the hybrid reference signal to a UE or another device via the antenna 202. The antenna 202 may include one or more directional or omni-directional antennas such as dipole antennas, monopole antennas, patch antennas, loop antennas, microstrip antennas, and/or other types of antennas suitable for reception and/or transmission of radio frequency ("RF") or other wireless communication signals. Although FIG. 2 depicts a single antenna, the AN 102 may include additional antennas to receive and/or transmit wireless signals.

In some embodiments, the AN 102 may transmit multiple different hybrid reference signals from multiple different antennas. For example, the assignment logic 206 may be configured to assign indices to a third set ("S3") and a fourth set ("S4"), and the identification logic 208 may be further configured to identify resource elements for a second hybrid reference signal in accordance with R1 for each index in S3 and in accordance with R2 for each index in S4. The set S3 may be different from the set S1. The transmission logic 210 may be configured to provide the hybrid reference signal (using the resource elements identified based on S1 and S2) via a first antenna and to provide the second hybrid reference signal (using the resource elements identified based on S3 and S4) via a second antenna different from the first antenna.

The transmission logic 210 may be configured to provide any suitable data, in addition to a hybrid reference signal, to other devices in the wireless communication network 100. In some embodiments, the transmission logic 210 may be configured to provide a cell identifier (such as a physical layer cell identity) to one or more of the UEs served by the cell associated with the AN 102 (e.g., the UE 108 in the cell 114). The transmission logic 210 may also be configured to provide information regarding the hybrid reference signal to the UE 108. For example, in some embodiments, the transmission logic 210 may be configured to provide an indicator of S1 and S2 (the sets of indices identified by the assignment logic 206) for transmission to the UE 108. This indicator may be, for example, the maximum and minimum values of the indices in each of S1 and S2, or any other suitable indicator to communicate the content of S1 and S2 to the UE 108. In some embodiments, the transmission logic 210 may be configured to provide an indicator of R1 and R2 (the rules used by the identification logic 208 to identify resource elements) for transmission to the UE 108. This indicator may include information about any of the parameters needed to specify R1 and/or R2. Examples of rules that may include multiple parameters are described below with reference to FIG. 3.

Figure 3:
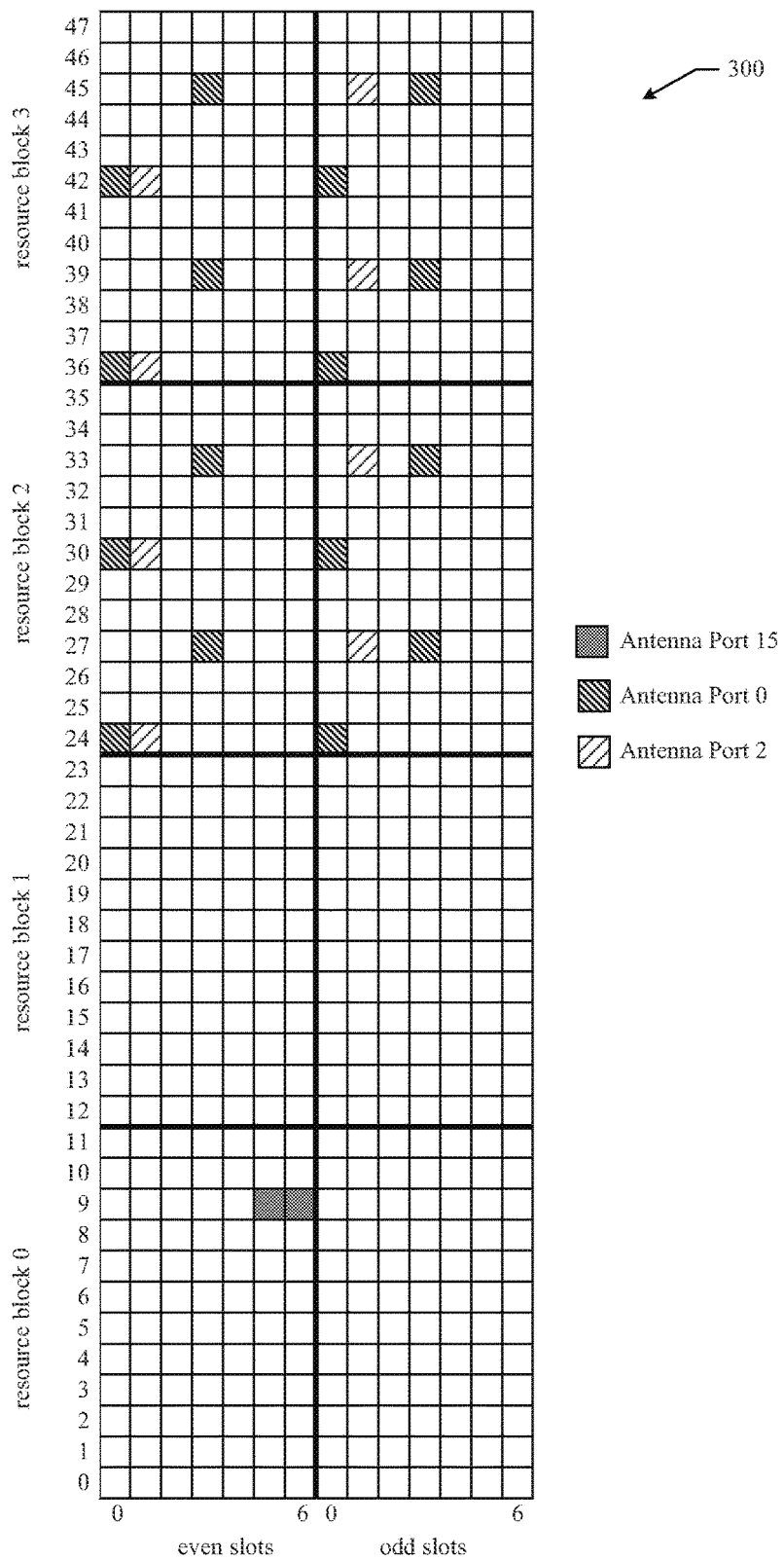
FIG. 3 illustrates an example hybrid reference signal, in accordance with various embodiments.

FIG. 3 illustrates an example hybrid reference signal 300 that may be generated by the AN 102 in accordance with various embodiments. The different shadings indicate reference symbols transmitted on different antenna ports, as indicated in FIG. 3 and as discussed below. The hybrid reference signal 300 illustrates a number of the hybrid reference signal features discussed herein, but should not be viewed as limiting. In the example hybrid reference signal 300, two different sets of indices and corresponding rules are used to identify the resource elements for the hybrid reference signal 300; however, as noted above, three or more rules may be used in accordance with the techniques disclosed herein. In FIG. 3, only the resource elements identified for use in the hybrid reference signal 300 are illustrated; the symbols that are transmitted in the identified resource elements are not illustrated (although symbol identification techniques are discussed below).

In this example, the indices in the S1 and S2 may be assigned from the set $\{0, 1, \ldots, N_{DL}^{RB}-1\}$. For ease of illustration, the following example assumes that $N_{DL}^{RB}=4$, that S1={0} and that S2={2,3}. In some embodiments, not all indices need be included in S1 or S2; in the example of FIG. 3, the index 1 is not assigned to either S1 or S2. These indices and assignments are made simply for ease of illustration; in some embodiments, the downlink bandwidth $N_{DL}^{RB}$ may include 50 resource blocks or more.

In this example, R1 may identify resource elements (and also symbols, in some embodiments) for a hybrid reference signal that may be transmitted on one, two, four, eight, or another number of antenna ports. For each index m, R1 may identify one or more resource elements (k,l) in accordance with $$(k,l)=(k'+12m+\lambda, l'+\beta) \quad (1)$$

where the parameters k', δ, l' and β may be determined by the identification logic 208 in any of a number of ways. In some embodiments, k' may be a function of a selected reference signal configuration, which may depend on the frame structure used, and by the number of antenna ports used. The reference signal configuration may be a predetermined configuration corresponding to the periodicity of reference signal symbols and the subframe offset of those reference signal symbols. The reference signal configuration and/or the number of antenna ports may be determined by the AN 102, or may be determined by another component and wirelessly communicated to the AN 102 (e.g., via the reception logic 204). In some embodiments, k' may be determined as described below in Tables 1 and 2 for normal and extended CP, respectively. In some embodiments, the parameter δ may be determined based on whether normal or extended CPs are used, and/or based on which antenna port is being used to transmit a portion of the hybrid reference signal. In some embodiments, δ may be selected as described below in Table 3.

In some embodiments, l' may be a function of a selected reference signal configuration, which may depend on the frame structure used, and by the number of antenna ports used, as discussed above with reference to k'. In some embodiments, l' may be determined as described below with reference to Table 1. In some embodiments, β may be a function of the selected reference signal configuration, and/or on whether normal or extended CPs are used. In some embodiments, β may be selected as described below in Table 4.

In some embodiments, a hybrid reference signal may only be transmitted in resource elements included in particular slots, $n_s$, within a radio frame. In some embodiments, the resource elements used in a hybrid reference signal may vary between different slots. For example, in some embodiments, a hybrid reference signal may be transmitted in even-numbered slots but not in odd-numbered slots. These slots $n_s$ may be determined by the AN 102, or may be determined by another component and wirelessly communicated to the AN 102 (e.g., via the reception logic 204). In some embodiments, the slots $n_s$ in which the hybrid reference signal may be transmitted are described below in Table 1.

TABLE 1

Example embodiment for the determination of k', l' and $n_s$ in normal CP.

| | Reference signal configuration | Number of Antenna Ports | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 1-continued

Example embodiment for the determination of k', l' and $n_s$ in normal CP.

| | Reference signal configuration | Number of Antenna Ports | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

Example embodiment for the determination of k', l' and $n_s$ in extended CP.

| | Reference signal configuration | Number of Antenna Ports | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

TABLE 3

Example embodiment for the determination of δ.

| p, CP | δ |
|---|---|
| p ∈ {15, 16}, normal CP | 0 |
| p ∈ {17, 18}, normal CP | −6 |
| p ∈ {19, 20}, normal CP | −1 |
| p ∈ {21, 22}, extended CP | 7 |
| p ∈ {15, 16}, extended CP | 0 |
| p ∈ {17, 18}, extended CP | −3 |
| p ∈ {19, 20}, extended CP | −6 |
| p ∈ {21, 22}, extended CP | −9 |

TABLE 4

Example embodiment for the determination of β.

| Reference signal configuration, CP | β |
|---|---|
| 0-19, normal CP | 0, 1 |
| 20-31, normal CP | 0, 2 |
| 0-27, extended CP | 0, 1 |

The first rule R1 may also specify the symbol to be transmitted in the identified resource element (k,l). In some embodiments, the identification logic 208 may identify the symbol to be transmitted based on the antenna port on which the portion of the hybrid reference signal is to be transmitted, the slot number within the radio frame, the symbol number l within the slot, whether normal or extended CPs are used, and/or an identifier of the wireless communication cell served by the AN 102. For example, in some embodiments in which the antenna port may be selected from the set of antenna ports {15, 16, . . . , 22}, R1 may identify the symbol to be transmitted in the identified (k,l) resource element on antenna port p, $a_{k,l}^{(p)}$ in accordance with $$a_{k,l}^{(p)} = w_{l''} \cdot r_{l,n_s}(m') \qquad (2)$$

where $$w_{l''} = \begin{cases} 1 & p \in \{15, 17, 19, 21\} \\ (-1)^{l''} & p \in \{16, 18, 20, 22\} \end{cases}, \qquad (3)$$

$$l'' = 0, 1, \qquad (4)$$

$$m' = m + \left\lfloor \frac{N_{RB}^{max,DL} - N_{RB}^{DL}}{2} \right\rfloor, \qquad (5)$$

$$r_{l,n_s}(m) = \frac{1}{\sqrt{2}}(1 - 2 \cdot c(2m)) + j\frac{1}{\sqrt{2}}(1 - 2 \cdot c(2m+1)), \qquad (6)$$

where c( ) is the output of a pseudo-random sequence generator defined in accordance with $$c(n) = (x_1(n+N_C) + x_2(n+N_C)) \bmod 2$$

$$x_1(n+31) = (x_1(n+3) + x_1(n)) \bmod 2,$$

$$x_2(n+31) = (x_2(n+3) + x_2(n+2) + x_2(n+1) + x_2(n)) \bmod 2 \qquad (7)$$

$N_C = 1600$, the first m-sequence is initialized with $x_1(0)=1$, $x_1(n)=0$, $n=1, 2, \ldots, 30$, and the initialization of the second m-sequence is denoted by $$c_{init} = \sum_{i=0}^{30} x_2(i) \cdot 2^i, \qquad (8)$$

where $$c_{init} = 2^{10} \cdot (7 \cdot (n_s+1) + l + 1) \cdot (2 \cdot N_{ID}^{CSI} + 1) + 2 \cdot N_{ID}^{CSI} + N_{CP} \qquad (9)$$

at the start of each symbol, $N_{ID}^{CSI}$ is a physical layer cell identity (unless an alternate value is configured by higher layers), and $$N_{CP} = \begin{cases} 1 & \text{for normal } CP \\ 0 & \text{for extended } CP \end{cases}. \qquad (10)$$

The second rule R2 may identify resource elements (and also symbols, in some embodiments) for a hybrid reference signal that may be transmitted on one, two, three, four, or another number of antenna ports. For each index m, R2 may identify one or more resource elements (k,l) in accordance with $$k = (6m_m \bmod 2N_{RB}^{DL}) + \lambda \qquad (11)$$

$$l = \begin{cases} 0, N_{symb}^{DL} - 3 & \text{if } p \in \{0, 1\} \\ 1 & \text{if } p \in \{2, 3\} \end{cases} \qquad (12)$$

where $m_m = \{2m, 2m+1\}$, and where the parameter $\lambda$ may be determined by the identification logic 208 in any of a number of ways. In some embodiments, the parameter $\lambda$ may depend on the slot number in a radio frame, the symbol number l within the slot, the antenna port on which the portion of the hybrid reference signal is to be transmitted, and/or an identifier of the wireless communication cell served by the AN 102. In some embodiments, $\lambda$ may be determined in accordance with $$\lambda = (v + v_{shift}) \bmod 6 \qquad (13)$$

where v is based on the slot number in the radio frame and the symbol number l within the slot, and $v_{shift}$ is based on a cell identifier. For example, v may be determined in accordance with $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \qquad (14)$$

while $v_{shift}$ may be determined in accordance with $$v_{shift} = N_{ID}^{cell} \bmod 6, \qquad (15)$$

where $N_{ID}^{cell}$ is a physical layer cell identity. In some embodiments, the determination of l may or may not be based on the antenna port p, and any other suitable determination may be used.

The second rule R2 may also specify the symbol to be transmitted in the identified resource element (k,l). In some embodiments, the identification logic 208 may identify the symbol to be transmitted based on the antenna port on which the portion of the hybrid reference signal is to be transmitted, the slot number within the radio frame, the symbol number l within the slot, whether normal or extended CPs are used, and/or an identifier of the wireless communication cell served by the AN 102. For example, in some embodiments, R2 may identify the symbol to be transmitted in the identified resource element (k,l) on the pth antenna port, $a_{k,l}^{(p)}$, in accordance with $$a_{k,l}^{(p)} = r_{l,n_s}(m') \qquad (16)$$

where $$m' = m_m + N_{RB}^{max,DL} - N_{RB}^{DL} \qquad (17)$$

$$r_{l,n_s}(m) = \frac{1}{\sqrt{2}}(1 - 2 \cdot c(2m)) + j\frac{1}{\sqrt{2}}(1 - 2 \cdot c(2m+1)) \qquad (18)$$

where $N_{RB}^{max,DL}$ is the largest downlink bandwidth configuration (expressed in multiples of $N_{sc}^{RB}$), and c(.) is the output of the pseudo-random sequence generator defined in accordance with Eq. (7) above and initialized with $$c_{init} = 2^{10} \cdot (7 \cdot (n_s+1) + l + 1) \cdot (2 \cdot N_{ID}^{cell} + 1) + 2 \cdot N_{ID}^{CSI} + N_{CP} \qquad (19)$$

at the start of each symbol.

In particular, the hybrid reference signal 300 illustrated in FIG. 3 depicts an embodiment in which the number of symbols in a slot, $N_{symb}^{DL}$, is equal to 7. When the identification logic 208 applies R1, one antenna port (the antenna port 15) is used to transmit reference symbols, the reference signal configuration is "0," and normal CP is used. When R2 is applied in the embodiment of FIG. 3, two antenna ports are used to transmit reference symbols (the antenna ports 0 and 2), and $v_{shift}$ is equal to zero. Employing R1 and R2 as described above, the resource elements in which reference symbols may be transmitted as part of the hybrid reference signal 300 are listed in Table 5 below and illustrated in FIG. 3.

TABLE 5

Example resource elements used in the hybrid reference signal of FIG. 3.

| m | Set of indices | Resource elements in hybrid reference signal for even-numbered slots | Resource elements in hybrid reference signal for odd-numbered slots |
|---|---|---|---|
| 0 | 1 | Antenna port 15: (9, 5), (9, 6) | — |
| 1 | — | — | — |
| 2 | 2 | Antenna port 0: (24, 0), (27, 3), (30, 0), (33, 3) Antenna port 2: (24, 1), (30, 1) | Antenna port 0: (24, 0), (27, 3), (30, 0), (33, 3) Antenna port 2: (27, 1), (33, 1) |
| 3 | 2 | Antenna port 0: (36, 0), (39, 3), (42, 0), (45, 3) Antenna port 2: (36, 1), (42, 1) | Antenna port 0: (36, 0), (39, 3), (42, 0), (45, 3) Antenna port 2: (39, 1), (45, 1) |

In some embodiments, the first and second rules used by the identification logic 208 may be rules already included in a wireless communication standard (e.g., 3GPP LTE), but used in different transmission modes or otherwise segregated. In such embodiments, if the AN 102 and the UE 108 are previously configured to operate in accordance with the wireless communication standard, adjusting the AN 102 and the UE 108 to operate in accordance with a hybrid reference signal utilizing both rules may not require excessive modification and may allow the re-use of existing components (such as logic components configured to provide a reference signal based on the first rule or the second rule). To form the hybrid reference signal, existing rules that result in higher density reference signal portions may be used in noisy conditions, and existing rules that result in lower density reference signal portions may be used in less noisy conditions, for examples. Additionally, data regarding the performance characteristics of the existing rules may be used to optimize the combination of the existing rules into the hybrid reference signal generation process (e.g., by assigning indices to S1 or S2 to adjust the relative use of R1 and R2 in response to information regarding noise and other environmental conditions). This may advantageously speed adoption and optimization of the hybrid reference signals disclosed herein.

Returning to FIG. 2, the AN 102 may also include reception logic 204. The reception logic 204 may be coupled with the antenna 202, and may be configured for receiving wired and/or wireless signals from other devices, such as any of the devices discussed above with reference to FIG. 1. For example, the reception logic 204 may be configured to receive wireless signals from a UE (such as the UE 110). Data received by the reception logic 204 may be temporarily or permanently stored in the memory 212. In some embodiments, the reception logic 204 may be configured to receive data representative of one or more wireless communication conditions that may affect the ability of the AN 102 to transmit and/or receive signals from a UE (e.g., the UE 108). Examples of wireless communication conditions may include noise from cells served by other ANs (e.g., the AN 104) or noise arising from any other source, changes in AN configuration (e.g., transitions to a coordinated multipoint mode, as discussed below), user speed (e.g., via a Doppler effect), frequency selectivity, or any other condition. In some embodiments, the assignment logic 206 may be coupled with the reception logic 204 and may be configured to use the wireless communication condition data to adjust the sets S1 and S2. In particular, the assignment logic 206 may be configured to change the distribution of indices between S1 and S2, thereby changing the occasions on which R1 and R2 are applied by the identification logic 208 and thereby changing the composition of the hybrid reference signal provided by the transmission logic 210. For example, after provision of a first hybrid reference signal (in resource elements identified based on S1 and S2), the assignment logic 206 may be configured to assign indices to third and fourth sets ("S3" and "S4," respectively) different from S1 and S2, respectively. The identification logic 208 may be configured to identify resource elements for a second hybrid reference signal in accordance with R1 for each index in S3 and in accordance with R2 for each index in S4. The transmission logic 210 may be configured to provide the second hybrid reference signal for wireless transmission, thereby changing the composition of the hybrid reference signal between the first and second hybrid reference signals. In some embodiments, the AN 102 may be configured to change the composition of a hybrid reference signal in response to a determination that a noise measure violates a predetermined threshold. In some embodiments, the AN 102 may be configured to change a composition of the hybrid reference signal in response to a determination that the AN 102 is to operate in a coordinated multipoint mode.

Figure 4:
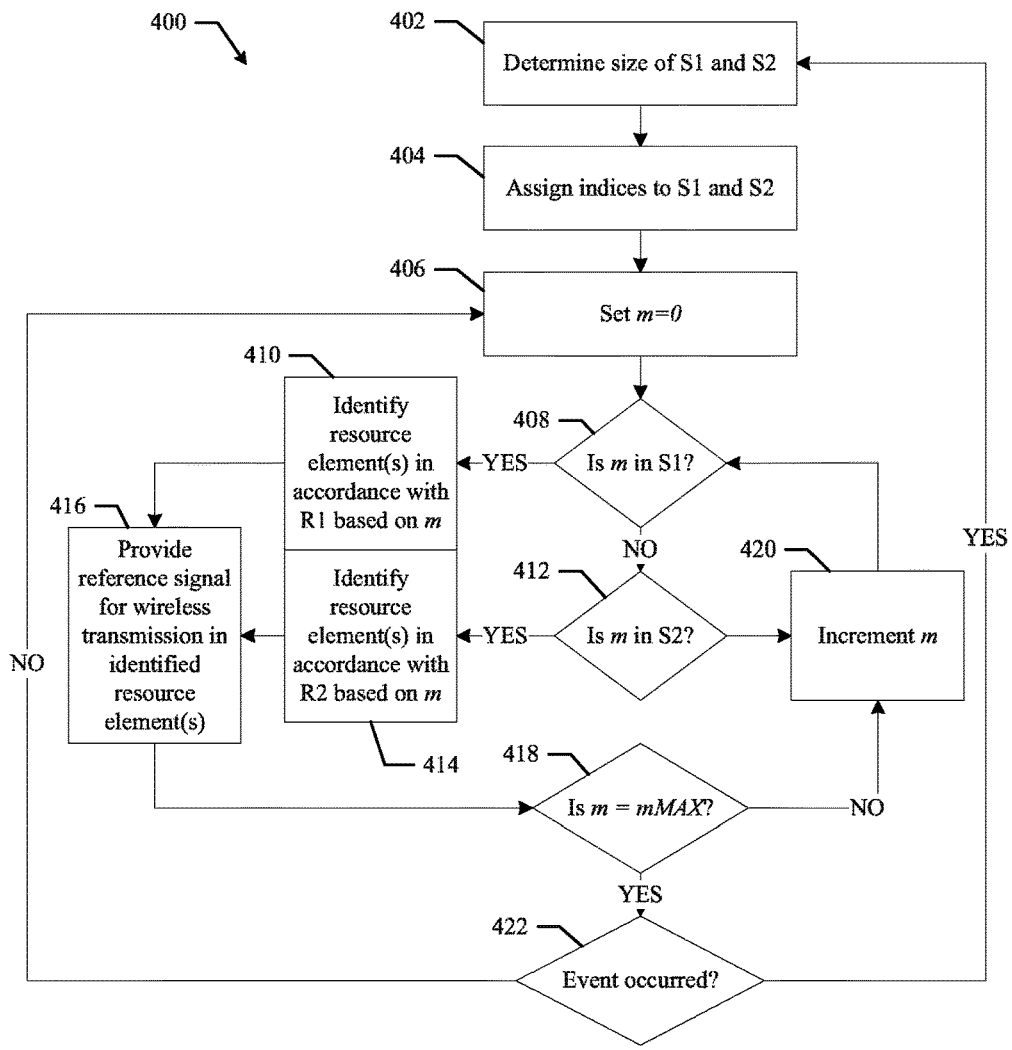
FIG. 4 is a flow diagram illustrating a method for providing a hybrid reference signal, in accordance with various embodiments.

FIG. 4 is a flow diagram illustrating a method 400 for providing a hybrid reference signal, in accordance with some embodiments. It may be recognized that, while the operations of the method 400 (and the other methods described herein) are arranged in a particular order and illustrated once each, in various embodiments, one or more of the operations may be repeated, omitted or performed out of order. For illustrative purposes, operations of the method 400 may be described as performed by the AN 102 (in communication with the UE 108), but the method 400 may be performed by any suitably configured device (e.g., a programmed processing system, an ASIC, or another wireless computing device). Various ones of the operations illustrated in FIG. 4 may be performed or not performed by an AN configured to provide a hybrid reference signal.

At the operation 402, the assignment logic 206 may determine the sizes of S1 and S2. In some embodiments, the assignment logic 206 may determine the sizes of S1 and S2 by accessing default size values stored in the memory 212, or by receiving data representative of sizes of S1 and S2 from another device (e.g., the core network 106). The default size values may specify, for example, a percentage of the total number of resource blocks in the downlink bandwidth for which resource elements for a hybrid reference signal should be identified in accordance with R1 and R2, respectively, and the assignment logic 206 may determine the sizes of S1 and S2 accordingly. For example, if 40% of the downlink bandwidth is to correspond to R1, 50% is to correspond to R2, and the downlink bandwidth $N_{DL}^{RB}$ is equal to 10 resource blocks, the assignment logic may determine that the size of S1 should be 4 and the size of S2 should be 5. In some embodiments, the assignment logic 206 may determine the sizes of S1 and S2 based on wireless communication condition data received by the reception logic 204, as discussed above. For example, in some embodiments, R1 may output more resource elements for reference signal symbols per input index than R2 (and may thereby generate a portion of the hybrid reference signal having a higher density than R2).

At the operation 404, the assignment logic 206 may determine which indices will be assigned to S1 and which indices will be assigned to S2. In some embodiments, S1 may be a set of contiguous indices (e.g., M1, M1+1, . . . , M2−1, M2). In some embodiments, S2 may be a set of contiguous indices. In some embodiments, S1 and/or S2 may not be sets of contiguous indices, and may instead have gaps, or may interleave.

At the operation 406, the identification logic 208 may initialize an index counter m by setting m=0 or another appropriate initial value. The value of the index counter m may be stored in the memory 212.

At the operation 408, the identification logic 208 may determine whether the index counter m is within S1. If the index counter m is in S1, the identification logic 208 may provide the index m as an input to the first rule R1, and may identify the one or more resource elements output from R1 for use in the hybrid reference signal at the operation 410. As discussed above, the identification logic 208 may be configured to identify a symbol for the hybrid reference signal in accordance with R1 for the identified resource element at the operation 410. In some embodiments, the identification of a resource element and the identification of a symbol for the resource element (under R1 or R2) may be performed at different times, in parallel, or independently.

If the identification logic 208 determines at the operation 408 that the index counter m is not within S1, the identification logic 208 may determine whether the index counter m is within S2 at the operation 412. In some embodiments, all possible indices are in the first set S1 or the second set S2. Thus, in such embodiments, the operation 412 need not be performed; the identification logic 208 may determine that the index counter m is within S2 by determining that the index counter m is not within S1.

If the identification logic 208 determines at the operation 412 that the index counter m is not within S2, the identification logic 208 may increment the value of the index counter m at the operation 420. The identification logic 208 may then determine whether the index counter m (now incremented) is in S1 at the operation 410, as discussed above.

If the identification logic 208 determines at the operation 412 that the index counter m is in S2, the identification logic 208 may provide the index m as an input to the first rule R2, and may identify the one or more resource elements output from R2 for use in the hybrid reference signal at the operation 414. As noted above, the identification logic 208 may be configured to identify a symbol for the hybrid reference signal in accordance with R2 for the identified resource element at the operation 414.

At the operation 416, the transmission logic 210 may provide the hybrid reference signal for wireless transmission in the resource elements identified at the operation 410 or the operation 414. In some embodiments, the transmission logic 210 may provide the symbols identified at the operation 410 or the operation 414 for transmission in the identified resource elements. Each symbol to be transmitted in each identified resource element for the hybrid reference signal may be provided for transmission at the operation 416 using a common transmission mode, regardless of whether R1 or R2 was used to identify the resource element or symbol.

At the operation 418, the identification logic 208 may determine whether the index counter m has reached its maximum value mMAX. In some embodiments, $mMAX=N_{DL}^{RB}$. If the index counter m has not reached its maximum value, the identification logic 208 may increment the value of the index counter m at the operation 420 (as discussed above) then return to the operation 408.

If the index counter m has reached its maximum value, the AN 102 (e.g., the reception logic 204) may determine at the operation 422 whether a wireless communication condition event has occurred. As used herein, a "wireless communication condition event" may refer to the receipt of data at the AN 102 representative of wireless communication conditions relevant to the AN 102, or the occurrence of a particular set of conditions relevant to the AN 102, for example. In some embodiments, the AN 102 may determine that wireless communication condition event has occurred when a noise measure violates a predetermined threshold. In some embodiments, the AN 102 may determine that wireless communication condition event has occurred when the reception logic 204 receives a signal or command (e.g., from the core network 106) that the AN 102 is to operate in a coordinated multipoint ("CoMP") mode in which the AN 102 will coordinate with one or more additional ANs (e.g., the AN 104) to serve a single UE (e.g., the UE 108). Determining that the AN 102 is to operate in CoMP mode may indicate that the AN 102 may need to estimate more than one channel and thus may want to adjust the scheduling of symbols in the hybrid reference signal in order to avoid collisions with reference signals on the channels. In some embodiments, the determination of whether a wireless communication condition event has occurred may be performed in parallel with the other operations of the method 400 (e.g., via an interrupt monitoring routine), and the method 400 may be interrupted or otherwise paused when wireless communication condition event has occurred in order to process the event and respond appropriately.

If the AN 102 determines at the operation 422 that a wireless communication condition event has occurred, the assignment logic 206 may return to the operation 402 and may determine a size for S1 and S2 at the operation 402, as discussed above. In some embodiments, the assignment logic 206 may change the size of S1 and/or S2 in response to a wireless communication condition event, as discussed above. In some embodiments, the assignment logic 206 may change the assignment of indices to S1 and/or S2 at the operation 404 in response to a wireless communication condition event.

If the AN 102 determines at the operation 422 that no wireless communication condition event has occurred, the identification logic 208 may re-initialize the index counter m at the operation 406, and may proceed as discussed above.

In some embodiments, the AN 102 may be configured to transmit a hybrid reference signal and the AN 102 or another device may be configured to transmit an additional reference signal. For example, in some embodiments, the hybrid reference signal of Example 3 may be transmitted along with a DMRS. In some such embodiments, antenna ports transmitting the hybrid reference signal and the DMRS may be quasi co-located, while in other such embodiments, the antenna ports are not quasi co-located. Two antenna ports may be quasi co-located if the large scale properties of the channel over which a symbol of one antenna port is conveyed can be inferred from the channel over which a symbol on the other antenna port is conveyed. The large-scale properties may include, for example, delay spread, Doppler spread, Doppler shift, average gain, and/or average delay. For example, the AN 102 may include a first antenna port that transmits the hybrid reference signal (for, e.g., time/frequency tracking or synchronization) and another transmit point ("TP"), such as an RRH, a pico-eNB, or a femto-eNB, may include a second antenna port that transmits the DMRS. The TP may be geographically separate from the AN 102 (e.g., 50-100 meters away). In embodiments in which the first and second antenna ports are not quasi co-located, a UE using the reference signals provided by the first and second antenna ports (e.g., the UE 108) may need to perform additional frequency tracking in order to achieve adequate performance. This additional frequency tracking may be particularly useful in high-order modulation scenarios, such as 64 quadrature amplitude modulation ("64QAM") in downlink CoMP (e.g., when the CoMP macro cell coverage includes a heterogeneous network with low power RRHs, and the TPs created by the RRHs have the same cell identifiers as the macro cell).

In some embodiments, the transmission logic 210 may be configured to provide an indicator that an antenna port that transmits a DMRS in accordance with the 3GPP LTE protocol is not quasi co-located with an antenna port that transmits the hybrid reference signal. This indicator may be provided to the UE in transmission mode 10 in a downlink control information ("DCI") message. For example, the indicator may be provided using the DCI format 2D. The DCI format 2D may be used in transmission mode 10 ("TM10") in 3GPP LTE. TM10 may be configured by higher layers, and may be used in CoMP operation. When the UE 108 is configured with TM10, the UE 108 may receive messages in DCI format 1A or DCI format 2D in the UE search space. While DCI format 1A is a common format that may be used for multiple transmission modes (e.g., particularly in fall-back operation), the DCI format 2D may be used only for TM10. Within DCI format 2D, the 3GPP LTE specification may specify a field named "PDSCH RE Mapping and Quasi-Co-Location Indicator." In some embodiments, an indicator that an antenna port that transmits a DMRS in accordance with the 3GPP LTE protocol is or is not quasi co-located with an antenna port that transmits the hybrid reference signal may be transmitted in DCI format 2D. In some embodiments, the indicator may be provided to the UE using a physical downlink shared channel ("PDSCH") resource element (RE)-mapping and quasi co-location indicator information bit field in the DCI message. A quasi co-location indicator may indicate which CRS antenna port (which may be quasi co-located with a DMRS antenna port) may be used for time and/or frequency tracking.

In some embodiments, a plurality of CRS antenna ports, for example, antenna port $x_0$ and antenna port x1, may be quasi co-located with respect to delay spread, doppler spread, doppler shift, or average delay. Information whether the CRS antenna ports are quasi co-located or not may be signaled for a UE. For example, the CRS antenna port $x_0$ may be transmitted from macro cell and port $x_1$ may be transmitted from another TP (Transmit Point) such as RRH, picocell, or femtocell. In this case, for the UE coordinated by the TP (RRH, pico cell, femto cell) to efficiently leverage the CRS port $x_1$ for frequency tracking, possibly with TM10 by DCI format 2D, eNB may signal to the UE whether these two CRS antenna ports $x_0$ and $x_1$ are quasi co-located or not. This signaling can be facilitated by means of RRC signaling or DCI signaling. If DCI signaling is used for this purpose, PQI (PDSCH RE Mapping and Quasi-Co-Location Indicator) information bit field in DCI format 2D may be used for indication.

Figure 5:
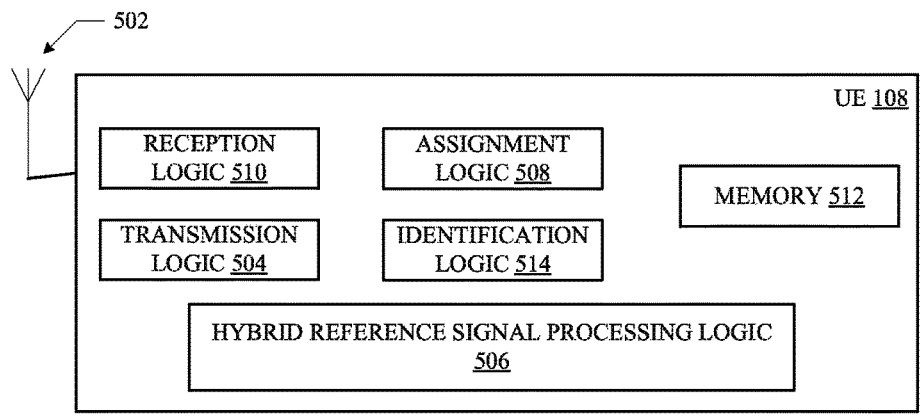
FIG. 5 is a block diagram of an illustrative user equipment ("UE") configured to receive a hybrid reference signal, in accordance with various embodiments.

In some embodiments, the UE 108 may be configured to receive and process a hybrid reference signal in accordance with various embodiments. Referring now to FIG. 5, example components of the UE 108 are illustrated. The components of the UE 108, discussed in detail below, may be included in any one or more UEs included in a wireless communication network (e.g., the UEs 110 and 112 of the wireless communication environment 100). In some embodiments, the UE 108 may be a smartphone, tablet, wearable computing device, or other wireless communication device.

The UE 108 may include reception logic 510. The reception logic 510 may be configured to receive wired and/or wireless signals from other devices, such as any of the devices discussed above with reference to FIG. 1. Data received by the reception logic 510 may be temporarily or permanently stored in the memory 512, which may take the form of any of the memory devices described herein. In particular, the reception logic 510 may be configured to wirelessly receive a hybrid reference signal transmitted from the AN 102 in accordance with any of the embodiments disclosed herein. The hybrid reference signal, including symbols transmitted in resource elements identified via R1 and symbols transmitted in resource elements identified via R2 as discussed above, may be transmitted to the UE 108 using a common transmission mode. The reception logic 510 may be coupled to an antenna 502, which may take the form of any of the antennas described herein (e.g., those described above with reference to the antenna 202 of FIG. 2).

The UE 108 may include assignment logic 508 and identification logic 514. In some embodiments, the assignment logic 508 and the identification logic 514 of the UE 108 may perform similar functions as the assignment logic 206 and the identification logic 208 of the AN 102. In particular, the assignment logic 508 may be configured to assign indices to a first set and a second set, and the identification logic 514 may be configured to identify resource elements for the hybrid reference signal in accordance with a first rule for each index in the first set and in accordance with a second rule for each index in the second set, for example. The assignment logic 508 and the identification logic 514 may perform their functions in response to signals from the AN 102 indicating the index assignment and identification rules to be applied. These index assignments and identification rules may be identical to those used by the AN 102.

The UE 108 may include hybrid reference signal processing logic 506. The hybrid reference signal processing logic 506 may be coupled to the reception logic 510, and may be configured to process the hybrid reference signal received by the reception logic 510. For example, as discussed above, the hybrid reference signal processing logic 506 may use the hybrid reference signal for channel estimation for demodulation, for the transmission of channel state information, for cell selection decisions, and/or for handover decisions, for example.

The UE 108 may also include transmission logic 504. The transmission logic 504 may be coupled with the antenna 502, and may be configured for providing wired and/or wireless signals to other devices, such as any of the devices discussed above with reference to FIG. 1. For example, the transmission logic 504 may be configured to provide wireless signals to an AN (such as the AN 102). In some embodiments, the transmission logic 504 may be configured to provide data representative of one or more wireless communication conditions that may affect the ability of an AN (e.g., the AN 102) to transmit and/or receive signals from the UE 108. A number of examples of wireless communication conditions are discussed above, such as SNR threshold conditions.

Figure 6:
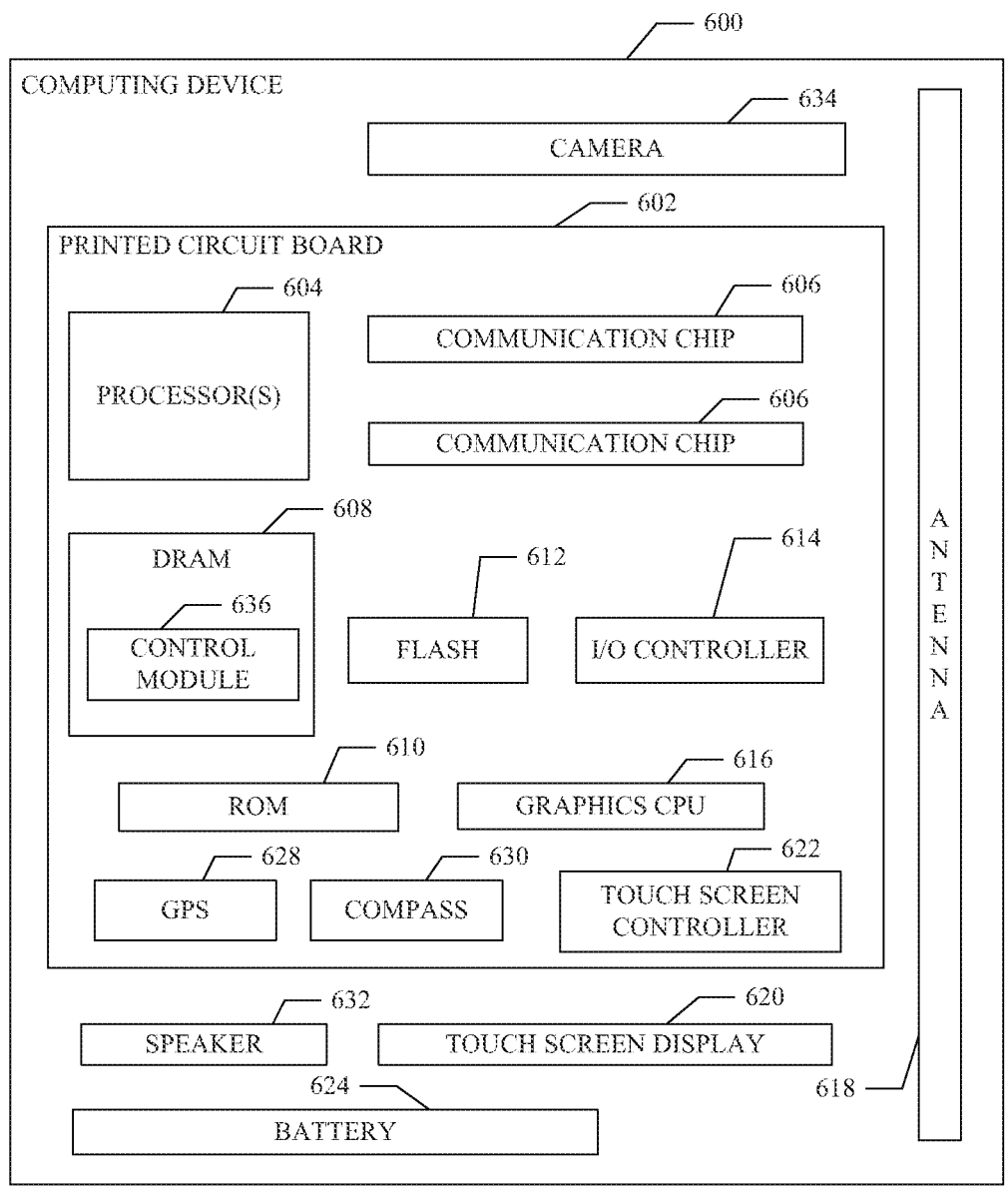
FIG. 6 is a block diagram of an example computing device that may be used to practice various embodiments described herein.

FIG. 6 is a block diagram of an example computing device 600, which may be suitable for practicing various disclosed embodiments. For example, the computing device 600 may serve as the AN 102, the UE 108, or any other suitable device discussed herein. The computing device 600 may include a number of components, including one or more processor(s) 604 and at least one communication chip 606. In various embodiments, the processor 604 may include a processor core. In various embodiments, at least one communication chip 606 may also be physically and electrically coupled to the processor 604. In further implementations, the communication chip 606 may be part of the processor 604. In various embodiments, the computing device 600 may include a PCB 602. For these embodiments, the processor 604 and the communication chip 606 may be disposed thereon. In alternate embodiments, the various components may be coupled without the employment of the PCB 602.

Depending on its applications (e.g., reference signal applications), the computing device 600 may include other components that may or may not be physically and electrically coupled to the PCB 602. These other components include, but are not limited to, volatile memory (e.g., dynamic random access memory 608, also referred to as "DRAM"), non-volatile memory (e.g., read-only memory 610, also referred to as "ROM," one or more hard disk drives, one or more solid-state drives, one or more compact disc drives, and/or one or more digital versatile disc drives), flash memory 612, input/output controller 614, a digital signal processor (not shown), a crypto processor (not shown), graphics processor 616, one or more antenna 618, touch screen display 620, touch screen controller 622, other displays (such as liquid-crystal displays, cathode-ray tube displays and e-ink displays, not shown), battery 624, an audio codec (not shown), a video codec (not shown), global positioning system ("GPS") device 628, compass 630, an accelerometer (not shown), a gyroscope (not shown), speaker 632, camera 634, and a mass storage device (such as hard disk drive, a solid state drive, compact disk ("CD"), digital versatile disk ("DVD")) (not shown), any other desired sensors (not shown) and so forth. In various embodiments, the processor 604 may be integrated on the same die with other components to form a System on Chip ("SoC"). Any components included in the computing device 600 (e.g., sensors) may be used in various reference signal applications (e.g., by inclusion in the reception logic 204 of the AN 102, or the transmission logic 504 of the UE 108).

In various embodiments, volatile memory (e.g., the DRAM 608), non-volatile memory (e.g., the ROM 610), flash memory 612, and the mass storage device may include programming instructions configured to enable the computing device 600, in response to execution by the processor(s) 604, to practice all or selected aspects of the processes described herein. For example, one or more of the memory components such as volatile memory (e.g., the DRAM 608), non-volatile memory (e.g., the ROM 610), the flash memory 612, and the mass storage device may include temporal and/or persistent copies of instructions that, when executed, enable computing device 600 to operate control module 636 configured to practice all or selected aspects of the processes described herein. Memory accessible to the computing device 600 may include one or more storage resources that are physically part of a device on which the computing device 600 is installed and/or one or more storage resources that is accessible by, but not necessarily a part of, the computing device 600. For example, a storage resource may be accessed by the computing device 600 over a network via the communications chip 606. Any one or more of these memory devices may be included in the memory 212 of the AN 102 or the memory 512 of the UE 108.

The communication chip 606 may enable wired and/or wireless communications for the transfer of data to and from the computing device 600. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems, as noted above. However, communication chips 606 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), and Digital Enhanced Cordless Telecommunications ("DECT"), Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

As discussed above with reference to the UE 108, in various implementations, the computing device 600 may be a laptop, a netbook, a notebook, an ultrabook, a smart phone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 600 may be any other electronic device that processes data.

The following paragraphs describe examples of various embodiments. Example 1 is an apparatus for providing a hybrid reference signal for wireless communication, including: assignment logic to assign indices to a first set and a second set; identification logic to identify resource elements for the hybrid reference signal in accordance with a first rule for each index in the first set and in accordance with a second rule for each index in the second set, the second rule different from the first rule; and transmission logic to provide the hybrid reference signal for wireless transmission using a common transmission mode in the identified resource elements.

Example 2 may include the subject matter of Example 1, and may further specify that the first rule identifies one resource element per slot of a radio frame, and the second rule identifies one resource element per subframe of a radio frame.

Example 3 may include the subject matter of any of Examples 1 and 2, and may further specify that the second set of indices includes a plurality of contiguous indices.

Example 4 may include the subject matter of any of Examples 1-3, and may further specify that: provide the hybrid reference signal for wireless transmission using a common transmission mode in the identified resource elements includes provide the hybrid reference signal for wireless transmission using a common transmission mode in the identified resource elements via a first antenna; the assignment logic is further to assign indices to a third set and a fourth set; the identification logic is further to identify resource elements for a second hybrid reference signal in accordance with the first rule for each index in the third set and in accordance with the second rule for each index in the fourth set; and the transmission logic is further to provide the second hybrid reference signal for wireless transmission using a common transmission mode in the identified resource elements via a second antenna different from the first antenna.

Example 5 may include the subject matter of claim 4, and may further specify that the third set of indices is different from the first set of indices.

Example 6 may include the subject matter of any of Examples 1-5, and may further specify that: the assignment logic is further to, after provision of the hybrid reference signal for wireless transmission using a common transmission mode in the identified resource elements, assign indices to a third set and a fourth set, the third set different from the first set, the fourth set different from the second set; the identification logic is further to identify resource elements for a second hybrid reference signal in accordance with the first rule for each index in the third set and in accordance with the second rule for each index in the fourth set; and the transmission logic is further to provide the second hybrid reference signal for wireless transmission using a common transmission mode in the identified resource elements.

Example 7 may include the subject matter of claim 6, and may further specify that the assignment logic is to assign indices to the third set and the fourth set in response to a determination that a noise measure violates a predetermined threshold.

Example 8 may include the subject matter of any of Examples 6-7, and may further specify that the assignment logic is to assign indices to the third set and the fourth set in response to a determination that the apparatus is to operate in a coordinated multipoint mode.

Example 9 may include the subject matter of any of Examples 1-8, and may further specify that the transmission logic is further to provide an indicator of the first set of indices and the second set of indices for transmission to a user equipment.

Example 10 may include the subject matter of any of Examples 1-9, and may further specify that the transmission logic is further to provide an indicator that an antenna port that transmits a demodulation reference signal in accordance with the Third Generation Partnership Project Long Term Evolution protocol is not quasi co-located with an antenna port that transmits the hybrid reference signal.

Example 11 is a method for providing a hybrid reference signal for wireless communication, including: assigning, by a computing device, indices to a first set and a second set; identifying, by the computing device, resource elements for the hybrid reference signal in accordance with a first rule for each index in the first set; and identifying, by the computing device, resource elements for the hybrid reference signal in accordance with a second rule for each index in the second set, wherein the second rule is different from the first rule and a different number of resource elements are identified for each index in accordance with the second rule than are identified for each index in accordance with the first rule Example 12 may include the subject matter of claim 11, and may further specify that the first rule identifies one resource element per slot of a radio frame, and the second rule identifies one resource element per subframe of a radio frame.

Example 13 may include the subject matter of any of Examples 11-12, and may further specify that the second set of indices includes a plurality of contiguous indices.

Example 14 may include the subject matter of any of Examples 11-13, and may further specify that the hybrid reference signal is to be provided via a first antenna, and further including: assigning, by the computing device, indices to a third set and a fourth set; identifying, by the computing device, resource elements for a second hybrid reference signal in accordance with the first rule for each index in the third set; and identifying, by the computing device, resource elements for the second hybrid reference signal in accordance with the second rule for each index in the fourth set; wherein the second hybrid reference signal is to be provided via a second antenna different from the first antenna.

Example 15 may include the subject matter of claim 14, and may further specify that the third set of indices is different from the first set of indices.

Example 16 may include the subject matter of any of Examples 11-15, further including: after identifying resource elements for the hybrid reference signal for the indices in the first and second sets, assigning, by the computing device, indices to a third set and a fourth set, the third set different from the first set and the fourth set different from the second set; identifying, by the computing device, resource elements for a second hybrid reference signal in accordance with the first rule for each index in the third set; and identifying, by the computing device, resource elements for the second hybrid reference signal in accordance with the second rule for each index in the fourth set, the second rule different from the first rule.

Example 17 may include the subject matter of claim 16, and may further specify that the third set of indices and the fourth set of indices are identified in response to determining, by the computing device, that a noise measure violates a predetermined threshold.

Example 18 may include the subject matter of any of Examples 16-17, and may further specify that the third set of indices and the fourth set of indices are identified in response to determining, by the computing device, that the computing device is to operate in a coordinated multipoint mode.

Example 19 may include the subject matter of any of Examples 11-18, further including: providing, by the computing device, an indicator of the first set of indices and the second set of indices for transmission to a user equipment.

Example 20 may include the subject matter of any of Examples 11-19, further including: providing, by the computing device, an indicator that an antenna port that transmits a demodulation reference signal in accordance with the Third Generation Partnership Project Long Term Evolution protocol is not quasi co-located with an antenna port that transmits the hybrid reference signal.

Example 21 is an apparatus for receiving a hybrid reference signal, including: assignment logic to assign indices to a first set and a second set; identification logic to identify resource elements for the hybrid reference signal in accordance with a first rule for each index in the first set and in accordance with a second rule for each index in the second set, the second rule different from the first rule; and reception logic to receive the hybrid reference signal in a common transmission mode in the identified resource elements.

Example 22 may include the subject matter of claim 21, and may further specify that the first rule identifies one resource element per slot of a radio frame, and the second rule identifies one resource element per subframe of a radio frame.

Example 23 may include the subject matter of any of Examples 21-22, and may further specify that: the assignment logic is further to, after reception of the hybrid reference signal using a common transmission mode in the identified resource elements, assign indices to a third set and a fourth set, the third set different from the first set, the fourth set different from the second set; the identification logic is further to identify resource elements for a second hybrid reference signal in accordance with the first rule for each index in the third set and in accordance with the second rule for each index in the fourth set; and the reception logic is further to receive the second hybrid reference signal using a common transmission mode in the identified resource elements.

Example 24 is one or more computer readable media having instructions thereon which, when executed by one or more processing devices of an apparatus, cause the apparatus to perform the method of any of Examples 11-20.

Example 25 is an apparatus including means for performing the method of any of Examples 11-20.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An apparatus for providing a hybrid reference signal for wireless communication, comprising:
   assignment logic to:
     assign indices to a first set of resource blocks and a second set of resource blocks;
     assign indices to a third set of resource blocks and a fourth set of resource blocks in response to a determination that a noise measure violates a predetermined threshold, the third set different from the first set, the fourth set different from the second set
   identification logic to:
   identify resource elements for the hybrid reference signal, wherein identification of the resource elements includes to:
     apply a first rule to each index assigned to the first set to identify a first portion of the resource elements; and
     apply a second rule to each index assigned to the second set to identify a second portion of the resource elements, the second rule different from the first rule; and
   identify resource elements for a second hybrid reference signal in accordance with the first rule for each index assigned to the third set and in accordance with the second rule for each index assigned to the fourth set and transmission logic to:
   provide the hybrid reference signal for wireless transmission using a first common transmission mode in the identified resource elements, wherein assignment of the indices to the third set of resource blocks and the fourth set of resource blocks occurs after provision of the hybrid reference signal for wireless transmission using the first common transmission mode in the identified resource elements;
   provide the second hybrid reference signal for wireless transmission using a second common transmission mode in the identified resource elements,
   wherein a density of portions of the hybrid reference signal transmitted by resource elements associated with the indices assigned to the first set of resource blocks is different than a density of portions of the hybrid reference signal transmitted by resource elements associated with the indices assigned to the second set of resource blocks, and the transmission logic is further to provide an indicator as to whether an antenna port that is to provide the hybrid reference signal is quasi co-located with an antenna port that is to provide another reference signal.

2. The apparatus of claim 1, wherein the first rule identifies one resource element per slot of a radio frame, and the second rule identifies one resource element per subframe of a radio frame.

3. The apparatus of claim 1, wherein the indices assigned to the second set of resource blocks comprise a plurality of contiguous indices.

4. The apparatus of claim 1, wherein:
   to provide the hybrid reference signal for wireless transmission using first common transmission mode in the identified resource elements comprises to provide the hybrid reference signal for wireless transmission using the first common transmission mode in the identified resource elements via a first antenna; and
   the transmission logic is further to provide the second hybrid reference signal for wireless transmission using the second common transmission mode in the identified resource elements via a second antenna different from the first antenna.

5. The apparatus of claim 1 wherein the indices assigned to the third set of resource blocks are different from the indices assigned to the first set of resource blocks.

6. The apparatus of claim 1 wherein the assignment logic is to assign indices to the third set and the fourth set in response to a determination that the apparatus is to operate in a coordinated multipoint mode.

7. The apparatus of claim 1, wherein the indicator is a first indicator and the transmission logic is further to provide a second indicator of the indices assigned to the first set of resource blocks and the indices assigned to the second set of resource blocks for transmission to a user equipment.

8. The apparatus of claim 1, wherein the other reference signal is a demodulation reference signal (DMRS) in accordance with Third Generation Partnership Project Long Term Evolution protocol, and wherein the indicator indicates that the antenna port that is to provide the DMRS is not quasi co-located with the antenna port that is to provide the hybrid reference signal.

9. One or more non-transitory, computer readable media having instructions thereon which, when executed by one or more processing devices of a computing device, cause the computing device to:
   assign indices to a first set of resource blocks and a second set of resource blocks;
   identify a first portion of resource elements for a hybrid reference signal in accordance with a first rule being applied to each index in the first set; and
   identify a second portion of the resource elements for the hybrid reference signal in accordance with a second rule being applied to each index in the second set, wherein the second rule is different from the first rule and a different number of resource elements are identified for each index in accordance with the second rule than are identified for each index in accordance with the first rule, wherein a density of portions of the hybrid reference signal transmitted by the first portion of the resource elements associated with the first set of resource blocks is different than a density of portions of the hybrid reference signal transmitted by the second portion of the resource elements associated with the second set of resource blocks, and a transmission logic is further to provide an indicator as to whether a first antenna port that is to provide the hybrid reference signal is quasi co-located with a second antenna port that is to provide another reference signal, wherein the other reference signal is a demodulation reference signal (DMRS) in accordance with Third Generation Partnership Project Long Term Evolution protocol, and wherein the indicator indicates that the second antenna port is not quasi co-located with the first antenna port.

10. The one or more non-transitory, computer readable media of claim 9, wherein the first rule identifies one resource element per slot of a radio frame, and the second rule identifies one resource element per subframe of a radio frame.

11. The one or more non-transitory, computer readable media of claim 9, wherein the indices assigned to the second set of resource blocks comprise a plurality of contiguous indices.

12. The one or more non-transitory, computer readable media of claim 9, wherein the hybrid reference signal is to be provided via a first antenna, and further having instructions thereon which, when executed by the one or more processing devices of the computing device, cause the computing device to:
assign indices to a third set of resource blocks and a fourth set of resource blocks;
identify resource elements for a second hybrid reference signal in accordance with the first rule for each index in the third set; and
identify resource elements for the second hybrid reference signal in accordance with the second rule for each index in the fourth set;
wherein the second hybrid reference signal is to be provided via a second antenna different from the first antenna.

13. The one or more non-transitory, computer readable media of claim 12, wherein the indices assigned to the third set of resource blocks is different from the indices assigned to the first set of resource blocks.

14. The one or more non-transitory, computer readable media of claim 9, further having instructions thereon which, when executed by the one or more processing devices of the computing device, cause the computing device to:
after identification of the resource elements for the hybrid reference signal based on the first set and second set, assign indices to a third set of resource blocks and a fourth set of resource blocks, the indices assigned to the third set different from the indices assigned to the first set and the indices assigned to the fourth set different from the indices assigned to the second set;
identify a first portion of resource elements for a second hybrid reference signal in accordance with the first rule for each index assigned to the third set; and
identify a second portion of the resource elements for the second hybrid reference signal in accordance with the second rule for each index assigned to the fourth set, the second rule different from the first rule.

15. The one or more non-transitory, computer readable media of claim 14, wherein the indices assigned to the third set of resource blocks and the indices assigned to the fourth set of resource blocks are identified in response to determining, by the computing device, that a noise measure violates a predetermined threshold.

16. The one or more non-transitory, computer readable media of claim 14 wherein the indices assigned to the third set of resource blocks and the indices assigned to the fourth set of resource blocks are identified in response to determining, by the computing device, that the computing device is to operate in a coordinated multipoint mode.

17. The one or more non-transitory, computer readable media of claim 9, wherein the indicator is a first indicator and the media further includes instructions thereon which, when executed by the one or more processing devices of the computing device, cause the computing device to:
provide a second indicator of the indices assigned to the first set of resource blocks and the indices assigned to the second set of resource blocks for transmission to a user equipment.

18. An apparatus for receiving a hybrid reference signal, comprising:
assignment logic to assign indices to a first set of resource blocks and a second set of resource blocks;
identification logic to identify resource elements for the hybrid reference signal in accordance with a first rule being applied to each index assigned to the first set and in accordance with a second rule being applied to each index assigned to the second set, the second rule different from the first rule, wherein a different number of resource elements are identified for each index in accordance with the second rule than are identified for each index in accordance with the first rule;
reception logic to:
receive the hybrid reference signal in a common transmission mode in the identified resource elements, wherein a density of portions of the hybrid reference signal received by resource elements associated with the first set of resource blocks is different than a density of portions of the hybrid reference signal transmitted received by resource elements associated with the second set of resource blocks; and
receive an indicator as to whether a first antenna port from which the hybrid reference signal is received is quasi co-located with a second antenna port from which another reference signal is to be received, wherein the other reference signal is a demodulation reference signal (DMRS) in accordance with Third Generation Partnership Project Long Term Evolution protocol, and wherein the indicator indicates that the second antenna port is not quasi co-located with the first antenna port; and
hybrid reference signal processing logic to process the hybrid reference signal and the indicator.

19. The apparatus of claim 18, wherein the first rule identifies one resource element per slot of a radio frame, and the second rule identifies one resource element per subframe of a radio frame.

20. The apparatus of claim 18, wherein the common transmission mode is a first common transmission mode, and wherein:

the assignment logic is further to, after reception of the hybrid reference signal using a common transmission mode in the identified resource elements, assign indices to a third set of resource blocks and a fourth set of resource blocks, the indices assigned to the third set different from the indices assigned to the first set, the indices assigned to the fourth set different from the indices assigned to the second set;

the identification logic is further to identify resource elements for a second hybrid reference signal in accordance with the first rule being applied to each index assigned to the third set and in accordance with the second rule being applied to each index assigned to the fourth set; and the reception logic is further to receive the second hybrid reference signal using a second common transmission mode in the identified resource elements for the second hybrid reference signal.

* * * * *